UNITED STATES PATENT OFFICE.

JOHN E. SIEBEL, OF CHICAGO, ILLINOIS.

PROCESS OF TREATING BONE-BLACK.

No. 831,805.  Specification of Letters Patent.  Patented Sept. 25, 1906.

Application filed September 13, 1904. Serial No. 224,350.

*To all whom it may concern:*

Be it known that I, JOHN E. SIEBEL, a citizen of the United States, residing at 1424 Montana street, Chicago, in the county of Cook and State of Illinois, have invented certain new and useful Improvements in Processes of Treating Bone-Black, of which the following is a clear description, which will enable others skilled in the art to make and use the same.

The object of my invention is the production of a purifying material which possesses in an extraordinary degree the property of removing from water and other liquids and semiliquid masses noxious enzymes, coloring-matter, bad odor, and other matter objectionable in articles of food and drink and elsewhere. It is well known that bone-black, charcoal, and other carbonaceous matter possess similar purifying properties; but I have found that the material the preparation of which I am about to describe possesses these properties in manifold greater and more efficient degree.

The purifying material referred to is produced by extracting finely-ground bone-black (animal charcoal) first with an acid watery solution of the sulfate of an alkali, such as sulfate of soda, sulfate of potash, sulfate of ammonia; second, with a watery solution of an alkaline carbonate the base of which is the same as that of the alkaline sulfate used in the first extraction. Of the alkaline sulfates mentioned in the first extraction sulfate of ammonia or of soda or of potash may be used and for the second extraction the corresponding carbonates of ammonia soda or of potash.

For the extraction of, say, one hundred pounds of bone-black I take about thirty-five pounds of the sulfate, say of sulfate of ammonia, more or less, and dissolve the same in about eighty pounds of water, to which has been added eighty pounds of commercial sulfuric acid, more or less. The acid solution of sulfate of ammonia thus obtained is thoroughly mixed with the bone-black, and after the ensuing chemical action has subsided the mixture is thrown on a convenient filter, where the liquid draws off and is afterward washed out with water. The black mass remaining on the filter being thus thoroughly washed out represents the first grade of my purifying material. This material is not only freed or partially freed from a small percentage of carbonate of lime as a simple acid-washed bone-black would be, but the union between the active bone-black and the phosphate of lime is entirely broken up. Thereby the active surface and the absorptive properties of the bone-black particles are increased manifold, as my comparative experiments with those materials have shown. In order to further rectify the same and to regain the alkaline sulfate for a future preparation, it is mixed with a solution of thirty pounds of carbonate of ammonia, more or less, in about one hundred pounds of water. This mixture is again drained off and subsequently washed out with water by filtration or decantation, the remaining black mass representing the second grade of my purifying material, the extraordinary purifying properties of which are readily exemplified by mixing a small percentage of the semiliquid black mass with some foul water or other tainted liquid or semiliquid mass containing traces of objectionable matter. The liquid or semiliquid mass so treated will yield its objectionable constituents to the purifying material, which may be left in the liquid or mass so treated or separated from the same by filtration or sedimentation, if desired. The semiliquid black mass forming the purifying material may also be dried, in which condition it forms a blackish powder which can be readily stored, shipped, and used at any time.

The drainings of the first extract of the bone-black can be utilized for the manufacture of alkaline phosphates, while the drainings of the second extraction, which contain the same alkaline sulfate as that used in the first extraction, will be used in a subsequent operation for the first extraction. The mass remaining after the first abstraction—*i. e.*, the first grade of purifying material—has nearly the same purifying qualities as the mass remaining after the second extraction and may be used in the same way when the sulfate of lime which it contains is not objectionable, but even desirable, as is the case when water or other liquids or semiliquid masses are to be purified and hardened by sulfate of lime at the same time, as is frequently desirable when a hard, but pure, water is required. The purifying material prepared in the manner set forth may also be mixed with other substances sought to be incorporated in the water or other liquid or semiliquid masses at the same time at which they are purified; but I lay no claim to any special mixture of this kind nor any special use thereof; but I do claim—

1. A process of preparing a purifying material consisting in treating bone-black with an acid solution of the sulfate of an alkali substantially in the manner and for the purpose set forth.

2. A process of preparing a purifying material consisting in treating bone-black with an acid solution of the sulfate of an alkali and then with a solution of carbonate of the same alkali substantially in the manner and for the purpose set forth.

JOHN E. SIEBEL.

Witnesses:
 PHILIP F. KELLER,
 CAROLINE SIEWERTSEN.